(12) United States Patent  (10) Patent No.: US 8,478,245 B2
Carion et al.  (45) Date of Patent: Jul. 2, 2013

(54) METHOD AND SYSTEM FOR RENDERING CONTENT ON A WIRELESS DEVICE

(75) Inventors: Pierre Carion, La Jolla, CA (US); Kevin Smith, San Diego, CA (US)

(73) Assignee: Phunware, Inc., Austin, TX (US)

( * ) Notice: Subject to any disclaimer, the term of this patent is extended or adjusted under 35 U.S.C. 154(b) by 1638 days.

(21) Appl. No.: 11/888,803

(22) Filed: Aug. 1, 2007

(65) Prior Publication Data

US 2009/0036105 A1  Feb. 5, 2009

(51) Int. Cl.
*H04M 3/42* (2006.01)
*H04M 1/00* (2006.01)

(52) U.S. Cl.
USPC .................. 455/414.1; 715/234; 715/744

(58) Field of Classification Search
USPC ..... 709/246; 455/414.1–414.4, 566; 715/200, 715/234–240, 744–747
See application file for complete search history.

(56) References Cited

U.S. PATENT DOCUMENTS

| | | | |
|---|---|---|---|
| 5,060,140 A | 10/1991 | Brown et al. | |
| 5,430,836 A * | 7/1995 | Wolf et al. | 715/744 |
| 6,336,124 B1 | 1/2002 | Alam et al. | |
| 6,343,318 B1 | 1/2002 | Hawkins et al. | |
| 6,345,279 B1 | 2/2002 | Li et al. | |
| 6,457,030 B1 | 9/2002 | Adams et al. | |
| 6,490,627 B1 | 12/2002 | Kalra et al. | |
| 6,795,710 B1 | 9/2004 | Creemer | |
| 6,884,172 B1 | 4/2005 | Lloyd et al. | 463/42 |
| 6,996,537 B2 | 2/2006 | Minear et al. | |
| 7,222,154 B2 | 5/2007 | Dowling | |
| 7,286,562 B1 | 10/2007 | Vargo et al. | |
| 7,506,070 B2 | 3/2009 | Tran et al. | |
| 7,568,201 B2 | 7/2009 | Suryanarayana et al. | |
| 7,580,703 B1 | 8/2009 | Veselov et al. | |
| 7,599,665 B2 | 10/2009 | Sinivaara | |

(Continued)

FOREIGN PATENT DOCUMENTS

| | | |
|---|---|---|
| EP | 1571547 A1 | 9/2005 |
| KR | 1020070003418 A | 1/2007 |
| KR | 1020080022697 A | 3/2008 |
| WO | 02103963 | 12/2002 |

OTHER PUBLICATIONS

Grundy, John et al; "An Architecture for Building Multi-device Thin-Client Web User Interfaces" Advanced Information Systems Engineering, vol. 2348/2002, Jan. 1, 2002, pp. 728-732, XP002511217.

(Continued)

*Primary Examiner* — Kashif Siddiqui
(74) *Attorney, Agent, or Firm* — Wilson Sonsini Goodrich & Rosati

(57) ABSTRACT

A method of rendering content on a wireless device. The wireless device sends a message to a server requesting an application and identifies itself with its rendering capabilities. The wireless receives an identification of a custom configuration of a plurality of rendering blocks of the wireless device associated with the application. The custom configuration configures the plurality of rendering blocks of the device. The wireless device receives compiled content from the application executing on the server that includes render commands expressed in a syntax that is device generic but has parameters specific to the rendering capabilities of the wireless device. A reader of the wireless device processes the compiled content and issues commands to individual rendering blocks of a graphical user interface based on the rendering commands of the compiled content and based on the custom configuration.

33 Claims, 9 Drawing Sheets

100A

U.S. PATENT DOCUMENTS

| | | | |
|---|---|---|---|
| 7,627,354 | B2 | 12/2009 | Khazaka et al. |
| 7,636,792 | B1 | 12/2009 | Ho |
| 7,671,869 | B2 | 3/2010 | Arnold et al. |
| 7,979,350 | B1 | 7/2011 | Carion et al. |
| 8,009,619 | B1 | 8/2011 | Clavel et al. |
| 2002/0018487 | A1 | 2/2002 | Chen et al. |
| 2002/0103881 | A1 | 8/2002 | Granade et al. |
| 2002/0109718 | A1 | 8/2002 | Mansour et al. |
| 2002/0131404 | A1 | 9/2002 | Mehta et al. |
| 2003/0018521 | A1 | 1/2003 | Kraft et al. |
| 2003/0106022 | A1 | 6/2003 | Goodacre et al. |
| 2003/0120637 | A1 | 6/2003 | Chithambaram et al. |
| 2003/0151621 | A1* | 8/2003 | McEvilly et al. ............. 345/744 |
| 2003/0182419 | A1 | 9/2003 | Barr et al. |
| 2004/0133848 | A1 | 7/2004 | Hunt et al. |
| 2004/0210907 | A1 | 10/2004 | Lau et al. |
| 2004/0236860 | A1 | 11/2004 | Logston et al. |
| 2004/0252197 | A1 | 12/2004 | Fraley et al. |
| 2005/0223352 | A1 | 10/2005 | Nishida |
| 2006/0031387 | A1 | 2/2006 | Hamzeh et al. |
| 2006/0123053 | A1 | 6/2006 | Scannell |
| 2006/0129632 | A1 | 6/2006 | Blume et al. |
| 2006/0236308 | A1 | 10/2006 | Lamb et al. |
| 2007/0067373 | A1 | 3/2007 | Higgins et al. |
| 2007/0078009 | A1 | 4/2007 | Lockton et al. |
| 2007/0123229 | A1 | 5/2007 | Pousti |
| 2007/0130156 | A1 | 6/2007 | Tenhunen et al. |
| 2007/0130333 | A1 | 6/2007 | Bhalla et al. |
| 2008/0016176 | A1 | 1/2008 | Leitner |
| 2008/0072139 | A1 | 3/2008 | Salinas et al. |
| 2008/0134018 | A1* | 6/2008 | Kembel et al. ................ 715/234 |
| 2009/0037329 | A1 | 2/2009 | Coppinger et al. |
| 2009/0037391 | A1 | 2/2009 | Agrawal et al. |
| 2009/0037724 | A1 | 2/2009 | Carion et al. |
| 2009/0177663 | A1 | 7/2009 | Hulaj et al. |
| 2009/0220068 | A1 | 9/2009 | Vialle et al. |
| 2009/0227274 | A1 | 9/2009 | Adler et al. |
| 2009/0259940 | A1 | 10/2009 | Moraes |
| 2010/0174974 | A1 | 7/2010 | Brisebois et al. |

OTHER PUBLICATIONS

Mir Farooq Ali et al: "Building Multi-Platform User Interfaces with UIML" Internet Citation, [online] XP002280476 Retrieved from the Internet: URL:http://arxiv.org/ftp/cs/papers/0111/0111024.pdf> [Retrieved on May 17, 2004].

Simon, Rainer et al: "Tool-Supported Single Authority for Device Independence and Multimodality" Proceedings of the 7th International Conference on Human Computer Interaction with Mobile Devices & Services, [Online] Sep. 19, 2005, Sep. 22, 2005 pp. 91-98, XP002511216 Retrieved from the Internet: URL: http//portal.acm.org/citation.cfm?id=1085777.1085793> [Retrieved on Jan. 19, 2009] abstract.

Thomas Ziegert et al: "Device Independent Web Applications—The Author Once-Display Everywhere Approach" Web Engineering; [Lecture Notes in Computer Science; LNCS], Springer-Verlag, Berlin/Heidelberg, vol. 3140, Jul. 7, 2004, pp. 244-255, XP019009054.

VanderDonckt, Jean et al: "Synchronised Model-Based Design of Multiple User Interfaces" Internet Article, [online] Sep. 10, 2004,pp. 1-8, XP002511218 Retrieved from the Internet: URL: http://web.archive.org/web/20040910043454/http://www.isys.ucl.ca.be/bchi/members/qli/pub/Vanderdonckt-IHM2001.pdf> [retrieved on Jan. 20, 2009].

U.S. Appl. No. 12/001,001, filed Dec. 7, 2007, Clavel.

U.S. Appl. No. 12/018,141, filed Jan. 22, 2008, Clavel.

Abrams, et al. UIML: An XML Language for Building Device-Independent User Interfaces. XML Conference Proceedings. Proceedings of XML, XX, XX, Dec. 1, 1999.

Ali, et al. Building Multi-Platform User Interfaces with UIML. Retrieved from the Internet: May 17, 2004. URL: arxiv.org/ftp/cs/papers/0111/0111024.pdf.

Final Office Action mailed Jun. 29, 2010 for U.S. Appl. No. 12/098,670, filed Apr. 7, 2008.

Final Office Action mailed May 12, 2009 for U.S. Appl. No. 11/977,186, filed Oct. 23, 2007.

International search report and written opinion dated Feb. 17, 2009 for PCT/US2008/009302.

International Search Report and Written Opinion mailed Oct. 6, 2009 for International PCT Application No. PCT/US2009/001514, 6 pgs.

International Search Report and Written Opinion mailed Oct. 6, 2009 for International PCT Application No. PCT/US2009/001516, 10 pgs.

International search report dated Jan. 30, 2009 for PCT Application No. US2008/009303.

Office action dated Feb. 7, 2011 for U.S. Appl. No. 11/888,799.

Office action dated Jun. 25, 2010 for U.S. Appl. No. 11/888,799.

Office Action mailed Mar. 9, 2012 for U.S. Appl. No. 12/018,141.

Office Action mailed Apr. 8, 2011 for U.S. Appl. No. 12/001,001.

Office Action mailed Jul. 7, 2011 for U.S. Appl. No. 12/018,141.

Office Action mailed Oct. 31, 2011 for U.S. Appl. No. 12/001,001.

Office Action mailed Aug. 19, 2010 for U.S. Appl. No. 11/977,319, filed Oct. 23, 2007.

Office Action mailed Dec. 3, 2008 for U.S. Appl. No. 11/977,186, filed Oct. 23, 2007.

Office Action mailed Feb. 16, 2010 for U.S. Appl. No. 11/977,186, filed Oct. 23, 2007.

Office Action mailed Jan. 7, 2010 for U.S. Appl. No. 12/098,670, filed Apr. 7, 2008.

Office Action mailed Jul. 30, 2010 for U.S. Appl. No. 11/977,229, filed Oct. 23, 2007.

Office Action mailed Jul. 9, 2010 for U.S. Appl. No. 11/977,186, filed Oct. 23, 2007.

Office Action mailed Jun. 21, 2010 for U.S. Appl. No. 11/977,212, filed Oct. 23, 2007.

Office Action mailed Sep. 17, 2009 for U.S. Appl. No. 11/977,212, filed Oct. 23, 2007.

Office Action mailed Sep. 2, 2009 for U.S. Appl. No. 11/977,186, filed Oct. 23, 2007.

Written Opinion mailed Feb. 1, 2010 for International PCT Aplication No. PCT/US2008/009302, 8 pgs.

Written Opinion mailed Feb. 1, 2010 for International PCT Aplication No. PCT/US2008/009303, 8 pgs.

Ziegert, et al. Device Independent Web Applications—The Author Once-Display Everywhere Approach. Web Engineering; [Lecture Notes in Computer Science; LNCS], Springer-Verlag, Berlin/Heidelberg. Jul. 7, 2004; 3140:244-255.

Office Action mailed Jan. 4, 2013 for U.S. Appl. No. 12/018,141.

* cited by examiner

METHOD AND SYSTEM FOR RENDERING CONTENT ON A WIRELESS DEVICE

RELATED U.S. PATENT APPLICATION

This Application is related to U.S. patent application Ser. No. 11/888,799 filed on Aug. 1, 2007, by Carion et al., and entitled "A SERVER METHOD AND SYSTEM FOR RENDERING CONTENT ON A WIRELESS DEVICE" and assigned to the assignee of the present invention.

TECHNICAL FIELD

Embodiments of the present invention relate to the field of wireless communication systems. More particularly, embodiments of the present invention relate to a method and system for rendering applications on a wireless device.

BACKGROUND ART

The widespread and increase in popularity of wireless devices have led to an increase in the number of wireless device types in the world. For example, the use of cellular phones, personal digital assistants (PDAs), PalmPilots, BlackBerrys, laptops, IPods, etc., have become prevalent in the market. The increase in the number of wireless devices has also increased the demand for various applications to run on various wireless devices.

The market is fractured among many manufacturers with different types of wireless devices including brands, models, generations, etc. For example, each year new manufacturers enter the market and existing manufacturers provide new models and new versions for existing wireless devices. Each wireless device is unique based on its brand, model, rendering capability, battery life, processing power, display resolution, color capability, display size, etc., collectively known as wireless device attributes.

Unfortunately, since each wireless device is unique, each application must be tailored in accordance with the wireless device attributes to fully utilize the capabilities of the wireless device. For example, to utilize the entire display of the wireless device, the application must be tailored to render the application in accordance with the display size and resolution of the wireless device.

Unfortunately, the increase in the number of applications, the types of wireless devices and the need to tailor each application to a given wireless device type has increased the cost of developing applications. With ever increasing number of models and brands of wireless devices, the number of applications and application versions required to accommodate all of these different wireless devices has increased as well. Since each application must be specific to a given wireless device type with a given brand and model, applications are substantially developed from the ground up for each wireless device type. Unfortunately, developing applications from the ground up for each wireless device has increased the cost of developing and customizing each application to accommodate each wireless device brand and model.

Moreover, the increase in cost of developing applications due to the need to tailor each application to all the specific brands and models of wireless devices has hindered and limited the number of titles that a software vendor can produce annually. Software developers simply do not have the time or the resources to take even a single application through a customized quality assurance and debugging process, much less each application for each type of wireless device, thereby limiting the number of titles that a software vendor can produce.

Also, the task of producing all the required versions of a title is not only time consuming and laborious but it also tends to limit upgrades and patches to existing titles. In general, a wireless device runs the application locally and renders the result. Thus, updating applications requires a patch/update to be specially developed for and provided to each wireless device individually. For example, updating/patching an application may require the wireless device user to access the application provider's website via the wireless device and to navigate through multiple pages in order to determine whether an update is ready. When an update is ready, the user actively initiates the update process. As a result, many users may not update their applications due to this laborious process.

SUMMARY

Accordingly, a need has arisen to enable software vendors to provide generic applications regardless of the wireless device type, thereby relieving software vendors from having to tailor their applications for each given wireless device type. Moreover, a need has arisen to not only relieve software vendors from tailoring their applications for a given wireless device type but to provide an output that is device specific based on the wireless device attributes where the output is generated from a generic application. Furthermore, it is advantageous to update and patch various applications without a need to access each wireless device individually. It will become apparent to those skilled in the art after reading the detailed description of the present invention that the embodiments of the present invention satisfy the above mentioned needs.

Embodiments of the present invention relieve software vendors from tailoring their applications based on each wireless device type because the server tailors the output of a generic application based on the wireless device capability. Moreover, embodiments of the present invention execute the requested application on the server. Thus providing software updates and patches for a generic application can be done by patching/updating the generic application on the server, thereby eliminating the need to update/patch each application on each wireless device.

According to one embodiment of the present invention, a wireless device includes an engine/reader. The engine/reader is operable to communicate with a server and receive a series of low level basic commands that layout content, position, etc. for rendering application content on the wireless device. The engine/reader interprets commands of a generic syntax that are device specific in their parameters.

The wireless device may also include a graphical user interface including a plurality of rendering blocks. A custom configuration may be used to customize the appearance of content generated by a requested application rendered on the rendering blocks. In other words, a custom configuration may be a set of low level instructions for preprogramming the plurality of rendering blocks to operate and look a certain way. The graphical user interface is operable for rendering basic commands received from the engine/reader and for customizing the operation and appearance of the requested application based on the custom configuration. The wireless device has software stored therein to implement the embodiments of the present invention.

In one embodiment, generic applications are provided by software vendors and are stored on a remote server. It is appreciated that these applications are not device specific. Once a wireless device in communication with the server requests an application, a message is sent via the engine/reader of the wireless device to the server. The message may include a request for a specific application as well as information identifying the wireless device type and its capability.

In response to the message from the wireless device, the server accesses the requested application by accessing a library of applications. The library of applications contains generic applications that on one level operate regardless of the device type. The requested application is executed on the server. Moreover, the server may identify a custom configuration to be used for the requested application and the device type. The custom configuration is the theme and determines certain graphical appearances of the requested application. In other words, the custom configuration provides the "look and feel" of the content of the requested application. The server may send a message to the wireless device identifying the custom configuration to be used. If the identified custom configuration is present on the wireless device it is used locally, otherwise the identified custom configuration is downloaded from the server to the wireless device. The custom configuration is specific to the display and audio capabilities of the wireless device and is also specific to the wireless device.

The server may determine the device capabilities (e.g., rendering capability of the wireless device) based on the received identification message and by accessing a library of device profiles. The library of device profiles includes information about the specific wireless device capabilities.

During the execution of an application, the server determines whether the executed application produces dynamic or static pages. If dynamic data is produced, a template engine of the server merges dynamic data provided by a business logic unit and template screens of the requested application provided by executing the application on the server. Business logic facilitates dynamic information exchange between the application executing and the templates. Thus, the template engine provides a high level template (e.g., extensible markup language (XML) format) that includes the merged screens of the requested application and dynamic data provided by the business logic. Accordingly, the resultant output is a high level generic template or page description.

Additionally, the template engine communicates with a device profile of the wireless device and may eliminate content of the requested application that is not supported by the wireless device based on the capabilities of the wireless device. For example, if the server determines that the wireless device has no audio capability, the content related to audio may be eliminated from the template. On the other hand, if a static page is produced, the template engine is bypassed and the static page is supplied to a layout solver directly.

The layout solver of the server then tailors the template based on the device profile and device capability. In one example, the layout solver also tailors static data based on the device profile and device capability. The layout solver translates the template and/or static page into a series of basic commands based on the device profile and device capabilities. Basic commands are written in a device independent syntax but tailored based on the wireless device capability. Accordingly, the basic commands are low level compilation operable to render objects using the plurality of rendering blocks of the wireless device. For example, basic commands may be used to layout page content of the requested application. Accordingly, the layout solver receives a generic template and/or static data of the requested application and translates it to application specific commands based on the device's capability. Basic commands are then transmitted to the wireless device for rendering.

The engine/reader of the wireless device receives the basic commands that are tailored and are specific to the wireless device based on device's attributes and capabilities. The syntax of these commands is device generic. The graphical user interface of the wireless device uses the received basic commands and the custom configuration to render the received page. Each command is typically associated with an operation to be performed by a rendering block of the wireless device and carries parameters, content, etc., for operation of that rendering block. Basic commands are used to layout content, position and etc. of the application while the custom configuration is used to customize the "look and feel" of the requested application (e.g., background color). The engine/reader may receive messages and content from the server without further interaction by the user or it may send/receive messages in response to user interaction.

As a result, software vendors do not need to tailor their application to each wireless device. In other words, software vendors can develop a generic application because the output of the generic application is tailored based on each wireless device type using the server. Moreover, since applications and basic commands for rendering applications are performed and generated on the server, providing patches and updates can be facilitated by updating the server, thereby eliminating the need to access each wireless device individually.

DETAILED DESCRIPTION

Figure 1A:
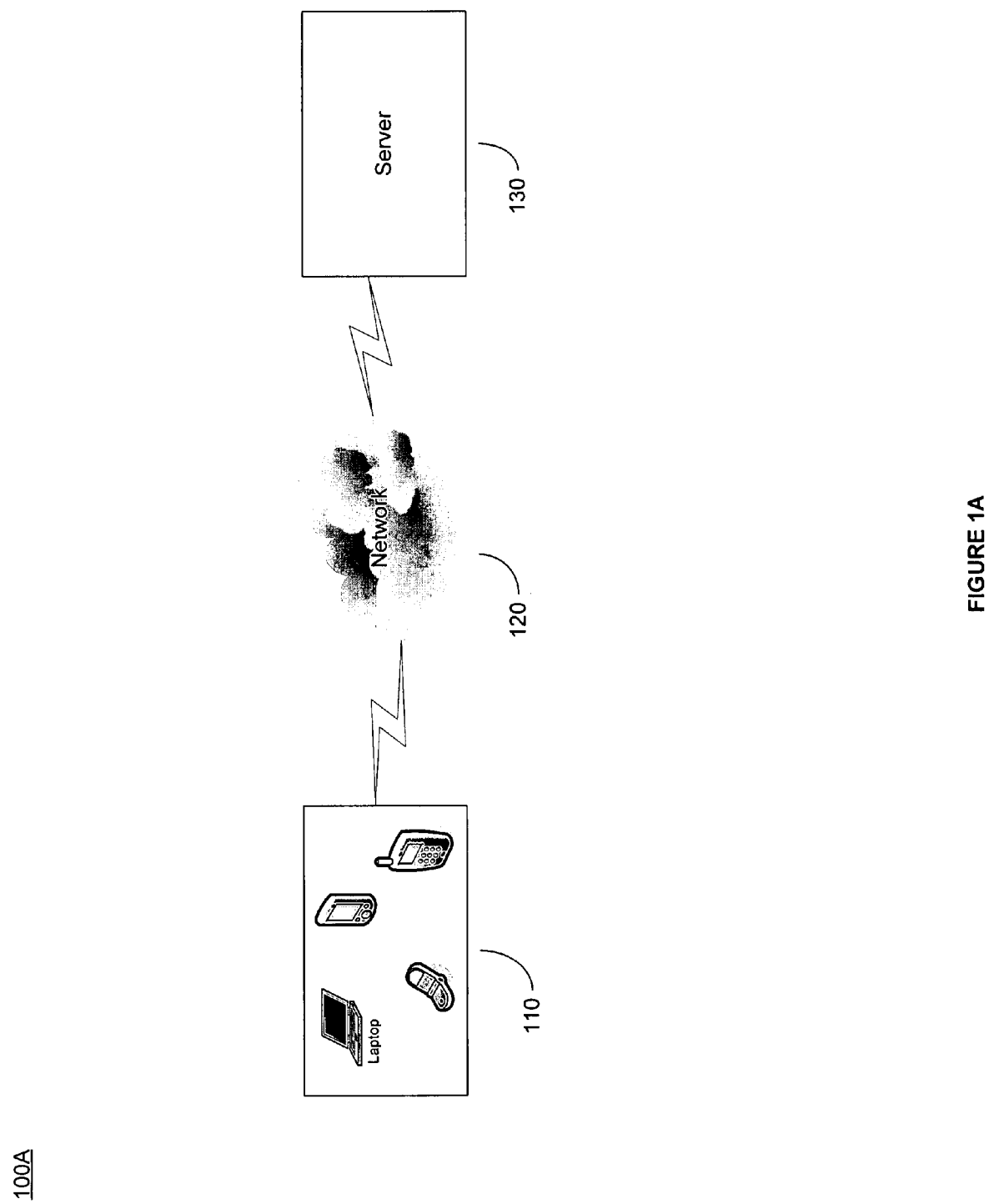
FIG. 1A shows an exemplary communication system in accordance with one embodiment of the present invention including wireless clients and a remote server.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "initiating" or "receiving" or "analyzing" or "generating" or "constructing" or "outputting" or "collecting" or "monitoring" or "outputting" or "storing" or "sending" or "receiving" or "identifying" or using" or "rendering" or "translating" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Rendering Content on a Wireless Device

The increase in the number of wireless devices has led to an increase in demand for different applications. However, each given application needs to be tailored to a given wireless device type based on the wireless device capability. Embodiments of the present invention relieve software vendors from tailoring their applications based on each wireless device type because the server tailors the output of a generic application based on the wireless device capability. Moreover, embodiments of the present invention execute the requested application on the server. Thus providing software updates and patches for a generic application can be done by patching/updating the generic application on the server, thereby eliminating the need to update/patch each application on each wireless device.

Referring now to FIG. 1A, an exemplary communication system 100A in accordance with one embodiment of the present invention including wireless clients and a remote server is shown. In one embodiment, one or more wireless devices 110 are coupled to a server 130 through a network 120. The wireless device 110 may be any mobile wireless electronic device, e.g., a cellular phone, a personal digital assistant (PDA), a pager, a smart phone, a BlackBerry, a laptop and the like. It is appreciated that the wireless device described herein is exemplary and is not intended to limit the scope of the present invention. Network 120 includes wireless communication capability.

According to an embodiment of the present invention, the remote server executes a generic application. It is generic in that it is not specific to any device or any set of device capabilities. The server will eventually translate the output of the application to a device specific set of commands for transmission to the device 110 for rendering. Likewise, the device 110 sends user input and other data to the remote server 130 for processing.

According to one embodiment of the present invention, a wireless device initiates a message requesting access to a given generic application stored on the server 130. It is appreciated that the wireless device in this embodiment has stored therein a software program or "client" that enables the wireless device to implement the embodiments of the present invention. This client may be downloaded to the wireless device 110 using well known conventional methods.

The server 130 in response to the received message may access the requested application that is generic regardless of the wireless device type. However, the server 130 generates a device specific result from the generic application, thereby tailoring the output of the generic application based on the wireless device type. The result in one example is a series of basic commands, precompiled and ready for audio and video rendering by the wireless device. During application execution, page layout information is sent to the wireless device for display and audio rendering using the basic commands. Also, user input and other state information is sent from the wireless to the server in accordance with the pages of the application. As a result, software vendors no longer need to tailor their applications for each wireless device type because a generic application can be used by the server to generate a tailored result application for each wireless device type.

Moreover, since the generic application is being executed by the server 130 instead of the wireless device 110, the generic application may be patched and updated on the server 130 without a need to access each wireless device individually. Furthermore, since the application is generic, the update and patch software is likewise device generic, thereby limiting the number of versions needed.

Figure 1B:
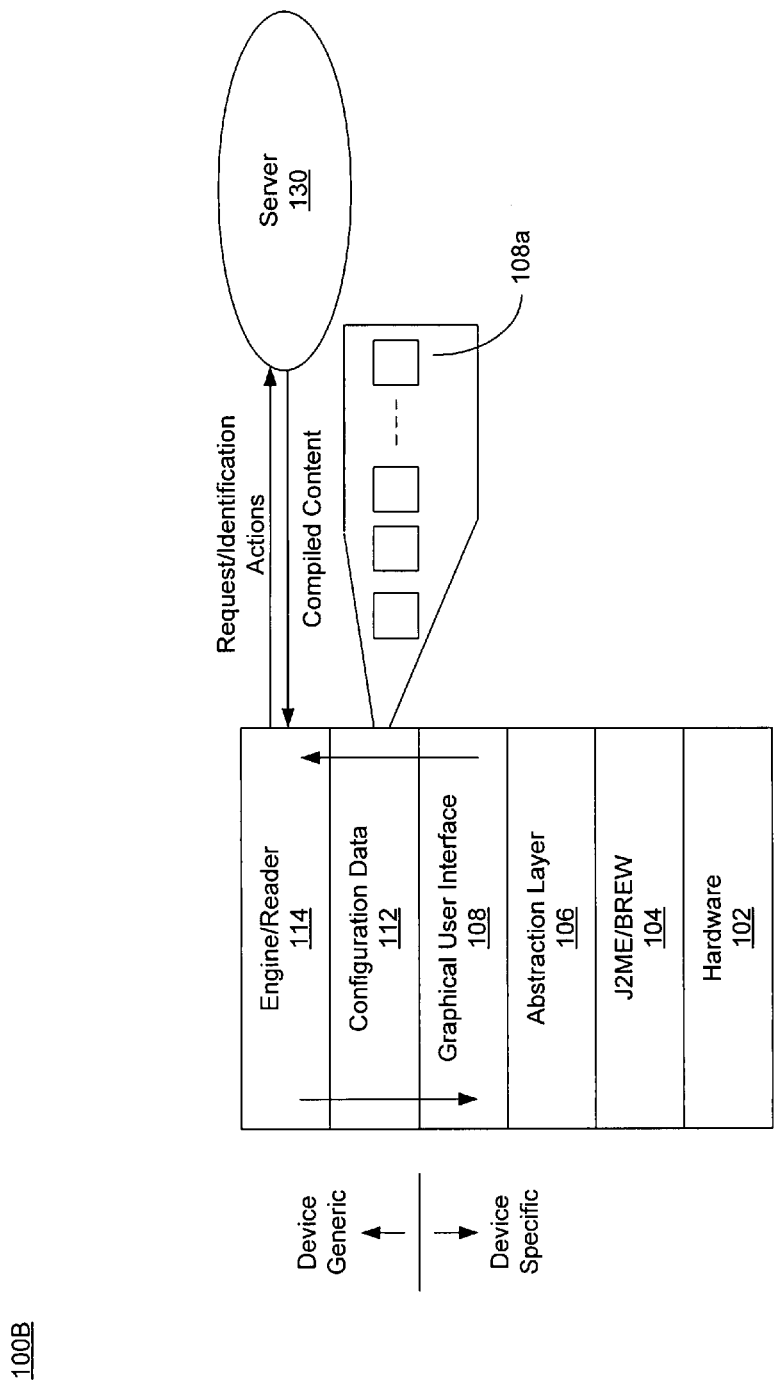
FIG. 1B shows an exemplary wireless device protocol stack in accordance with one embodiment of the present invention.

Referring now to FIG. 1B, an exemplary wireless device protocol or software stack 100B in accordance with one embodiment of the present invention is shown. In one embodiment, a wireless device may include a hardware component 102, a binary runtime for wireless device (BREW) and/or Java platform (J2ME) J2ME/BREW 104 for instance, an abstraction layer 106, a graphical user interface 108, a configuration data 112 and a reader/engine 114. It is appreciated that in one embodiment, the graphical user interface 108, abstraction layer 106, J2ME/BREW 104 and the hardware layer 102 are device specific. In comparison, the engine/reader 114 and the configuration data 112 may be device generic in terms of the syntax they use to operate. Blocks 104 through 114 can be downloaded to the device from the server and are called "the client."

The hardware 102 may be the actual circuitry of the wireless device. For example, hardware 102 may be the processor, display components, user inputs, audio rendering devices, etc. BREW 104 is a software platform that may be used to download and run small programs for playing games, sending messages, sharing photos and the like. The main advantage of BREW platform is ease of portability of applications. J2ME 104 is a collection of JAVA application programming interfaces (APIs) for the development of software for resource constrained devices such as PDAs, cellular phones and other consumer appliances. Accordingly, BREW and/or J2ME 104 and the like are software platforms that may be used to enable download, portability of application, running small programs for various applications such as games, sending messages, sharing photos and the like. It is therefore appreciated that the use of J2ME/BREW 104 is exemplary and should not be construed as limiting the scope of the present invention.

The abstraction layer 106 may be a software component used to translate commands and enable the wireless device to implement different embodiments of the present invention. For example, the abstraction layer 106 may be used to facilitate communication between the graphical user interface 108 and the J2ME/BREW 104 layer in accordance with embodiments of the present invention.

A graphical user interface layer 108 includes a number of individual rendering blocks 108*a* that perform discrete rendering operations to render a received page description. The engine/reader 114 passes commands to these rendering blocks to perform the rendering of the application content. Also, the engine/reader 114 receives user input from these blocks 108*a*. While the rendering blocks operate in a way that is device specific, they communicate using a device generic syntax. These rendering blocks may be preconfigured to operate and store data (e.g., images, audio data, etc.) in a specific manner. This pre-configuration may set a "look and feel" for a particular application. Once preconfigured, the received page descriptions then include commands that utilize the functionality of the blocks 108*a*.

The wireless device using the engine/reader 114 communicates with the server 130 via a device generic syntax to read the basic commands of a page description. The engine/reader also communicates to the server. For example, the engine/reader 114 may send a message that includes a request to access a generic application as well as the identification of the wireless device type. The engine/reader also communicates user actions and other state information to the server. In return, the engine/reader 114 may receive a compiled content from the server 130 that includes a series of basic commands for rendering the requested application. It is appreciated that the series of basic commands are written in a device independent syntax but tailored based on the wireless device rendering capability.

The engine/reader 114 may also receive updates from the requested application based on changes of the server state. For example, if a program with a ticker (e.g., stock ticker) is originally selected, then the engine/reader 114 may receive an update for the ticker periodically. It is appreciated that the engine/reader 114 may receive additional data from the graphical user interface 108 in response to a user interaction (e.g., selecting an icon) and may transmit that data to the server as an event.

The wireless device includes the configuration data 112 component. As discussed above, the configuration data may be used to customize the appearance of the requested application and represents programming and stored content of the graphical user interface 108. In other words, configuration data may be a set of low level instructions for preprogramming a plurality of rendering blocks 108*a* of the graphical user interface to operate and render data (e.g., "look") a certain way. For example, configuration data 112 may be used to customize a "submit" icon to look like an airplane flying away when pressed. The wireless device may store multiple configuration data 112 and cache new configuration data as new applications are accessed. It is appreciated that the terms configuration data and custom configuration are used interchangeably throughout this application.

According to one embodiment, configuration data 112 may include text fonts, text colors, background colors, background images, border thickness, border colors, frame colors of menus, style of menus (e.g., rounded, rectangle and etc.), styles of check boxes (square, round and etc.), images of non-selected icons, images of selected icons, graph colors, information for drawing (e.g., particular text font at a particular location, particular color at a given location, shape of a given size, image at a given point and etc.), icons to use for representing hierarchical data, colors of the bar/animation representing the progress when downloading and an animation to use when download is in progress and the like. It is appreciated that the configuration data 112 discussed above are exemplary and are not intended to limit the scope of the present invention.

The configuration data is programmed into the rendering blocks 108*a*. The graphical user interface 108 rendering blocks (e.g., icons) 108*a* render content and enable a user to interact with the requested application. For example a "submit" icon may be one of the rendering blocks of the graphical user interface (GUI) 108 that once selected submits a form.

In one example, the rendering blocks 108*a* may include an edit box for entering text, static text for displaying text, an image, a pop-up menu which may appear in response to a user interaction, a drop-down menu list, tabbed menu for displaying several pages where each tab may display a text and an optional icon, sound for controlling audio (e.g., pause, rewind, stop, play and the like), video to display a video with visual control panel (e.g., pause, rewind, stop, play and the like), ticker to display horizontal scrolling text, check box/radio button to enable selection/de-selection of items, rating control for rating content (e.g., movies), poll control for displaying the current poll result, canvas for drawing objects, a tree for displaying hierarchical data, scroll bar for scrolling up/down and/or left/right, a progress bar to display download progress, a table for displaying data in a tabular form, a calendar for displaying and enabling selection/de-selection of a date and the like. It is appreciated that the rendering blocks discussed above are exemplary and are not intended to limit the scope of the present invention.

In more detail a more comprehensive list of configuration data also known as "skinnable attributes" as well as the rendering blocks and their syntax is provided below. It is appreciated that some of the attributes have "×2" suffix for having two values. A first value is selected for default value and a second value is selected when a default value is not selected.

An edit box is a rendering block for entering text (e.g., a user name, a SSN, etc.). The text may appear in clear form, or as '*' to hide the text when the user uses this edit box to enter a password. Configuration data may include:
  font of the text (×2)
  color of the text (×2)
  background color (×2)
  background image (×2)

A static text is a rendering block used to display text. Configuration data may include:
  font of the text
  color of the text
  background color
  background image An image is a rendering block to display an image. An action may be associated to the image, e.g., in response to a user selecting the image, a request may be sent to the server. Configuration data may include:
    thickness of the border of the image (×2)
    color border of the image (×2)

A pop-up menu is a rendering block which appears on a given user action (e.g., by pressing the right softkey button). Configuration data may include:
    color of the frame of the menu
    style of the menu (rounded, rectangle, etc.)
    font of the text (×2)
    color of the text (×2)
    background color (×2)
    background image (×2)

A list is a rendering block for displaying a list of items in a list. An optional icon may be associated to each item in the list. The user can scroll this list and select an item. Configuration data include:
    font of the text (×2)
    color of the text (×2)
    background color (×2)
    background image (×2)
    thickness of the border for icons
    color of the border for icons A tabbed menu is a rendering block for a wireless device to display several pages due to a small screen size. Each tab may display a text and an optional icon. Configuration data may include:
    font of the text (×2)
    color of the text (×2)
    background color (×2)
    background image (×2)
    thickness of the border for icons (×2)
    color of the border for icons (×2)

Sound is a rendering block for a non visual control to play sound. This rendering block may optionally include a visual control panel for allowing the user to pause/rewind/stop the sound. The control may include the identification of the sound file to play.

Video is a rendering block to display a video clip. A visual control panel associated with the video may be displayed to allow the user to pause/rewind/stop the video. The control may include the URL that the wireless device should use to stream the video clip.

Ticker is a rendering block to display a horizontally scrolling text. Configuration data may include:
    thickness of the border
    color of the border
    font of the text
    color of the text
    background color
    background image Check box/radio button is a rendering block allowing the user to select/deselect an option in a screen. Configuration data may include:
    check box style: square, round, etc.
    color of the border
    font of the text
    color of the text
    background color Rating control is a rendering block that allows the user to rate content (e.g., image, video, etc.). This control may display five icons (e.g., stars, thumps up, etc.) and allow the user to select of one the icons. Configuration data may include:
    thickness of the border
    color of the border
    image for non selected icon
    image for selected icon Poll control is a rendering block for displaying a list of selectable propositions to the user. In response to a selection, the server may send the result to the client as a bar graph to show the current result of the poll. Configuration data may include:
    thickness of the border
    color of the border
    background color
    background image
    font of the text (×2)
    color of the text (×2)
    colors of the graph bars Canvas is a rendering block on the screen on which the server can draw elements. The server may send drawing instruction in this canvas such as draw this text with this font at this X/Y position, draw this line with this color between x1/y1 and x2/y2, draw this rectangle at x/y/width/height, draw this image at x/y, etc. It is appreciated that there is no equivalence to the canvas rendering block in a wap browser.

Tree is a rendering block for displaying hierarchical data. Configuration data may include:
    font of the text (×2)
    color of the text (×2)
    icons to use for the nodes of the tree Scroll bar is a rendering block that indicates that a page can be scrolled up and down or left and right.

Progress bar is a rendering block to provide the user with feedback about the advancement of the process in downloading content. This is a useful feature for lengthy downloads since "loading animation" does not always provide sufficient information as to the advancement of the content download. For example, a process bar may indicate a percentage of advancement. Configuration data may include:
    thickness of the border
    color of the border
    background color
    background image
    font of the text (×2)
    color of the text (×2)
    colors of the bar which indicated the progress Table is a rendering block that may be used to display data in rows/columns. Configuration data may include:
    thickness of the border
    color of the border
    background color
    background image
    font of the text (×2)
    color of the text (×2)

Calendar is a rendering block for allowing the user to pick a date and/or time without the risk of entering invalid data. Configuration data may include:
    thickness of the border
    color of the border
    background color
    background image
    font of the text (×2)
    color of the text (×2)

The GUI 108 uses the configuration data 112 to preprogram the plurality of rendering blocks 108*a* to operate and look a certain way. For example, the rendering block (e.g., scroll bar) may be customized by the GUI 108 based on the configuration data (e.g., an image of a shamrock leaf during St. Patrick's day) to customize the way the rendering block looks. Accordingly, the GUI 108 may receive compiled content for the requested application that includes a series of basic commands from the engine/reader 114 for rendering a page of the requested application. It is appreciated that the series of basic commands are written in a device independent syntax whose parameters are tailored based on the wireless device capability. The GUI 108 may then render the page of the application based on the received basic commands and the customized preprogrammed plurality of rendering blocks. As a result, the appearance of the received the page of the application and the plurality of rendering blocks are customized based on the configuration data.

Figure 2A:
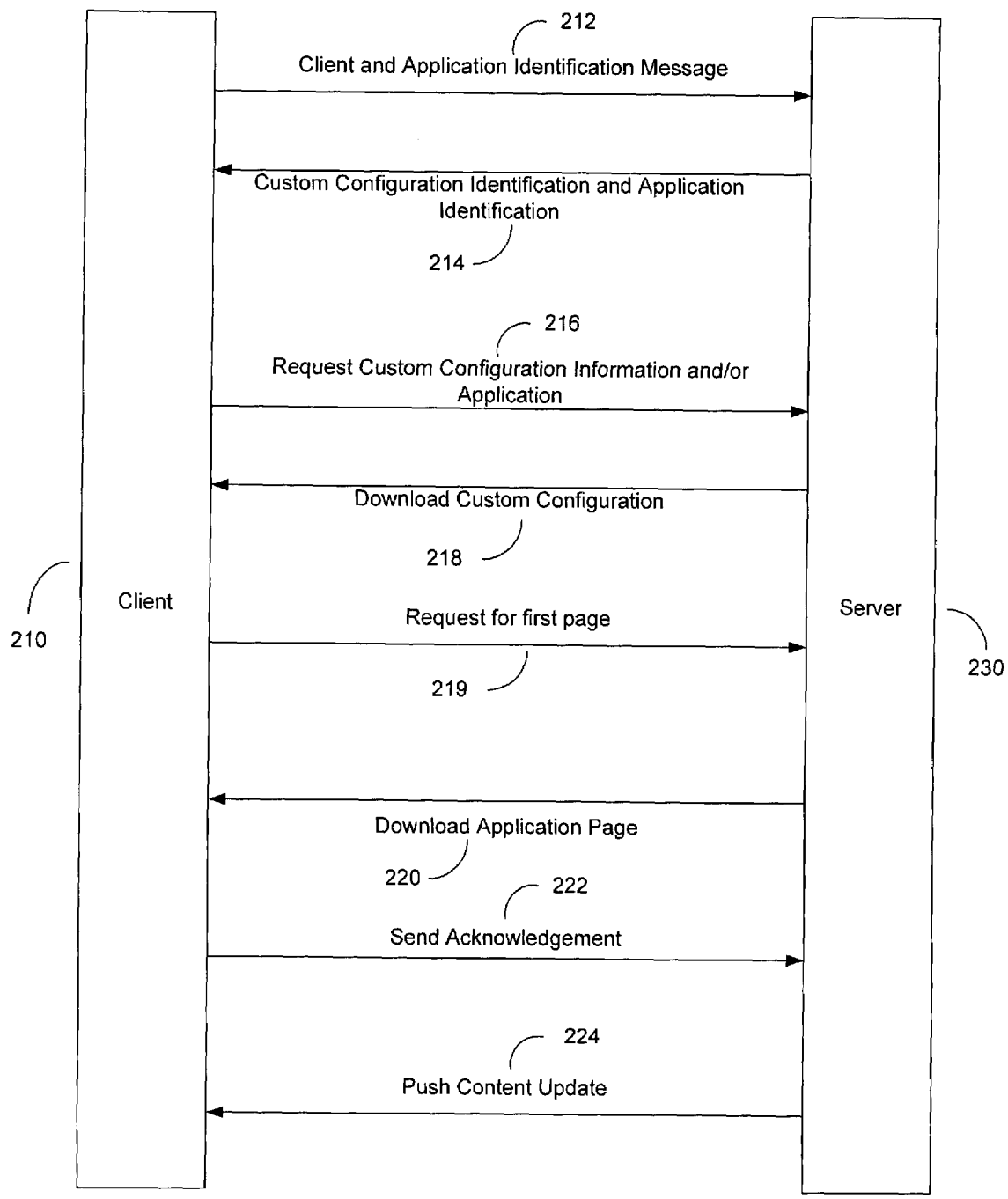
FIGS. 2A and 2B show an exemplary communication sequence between a wireless device and a remote server in accordance with one embodiment of the present invention.
Figure 2B:
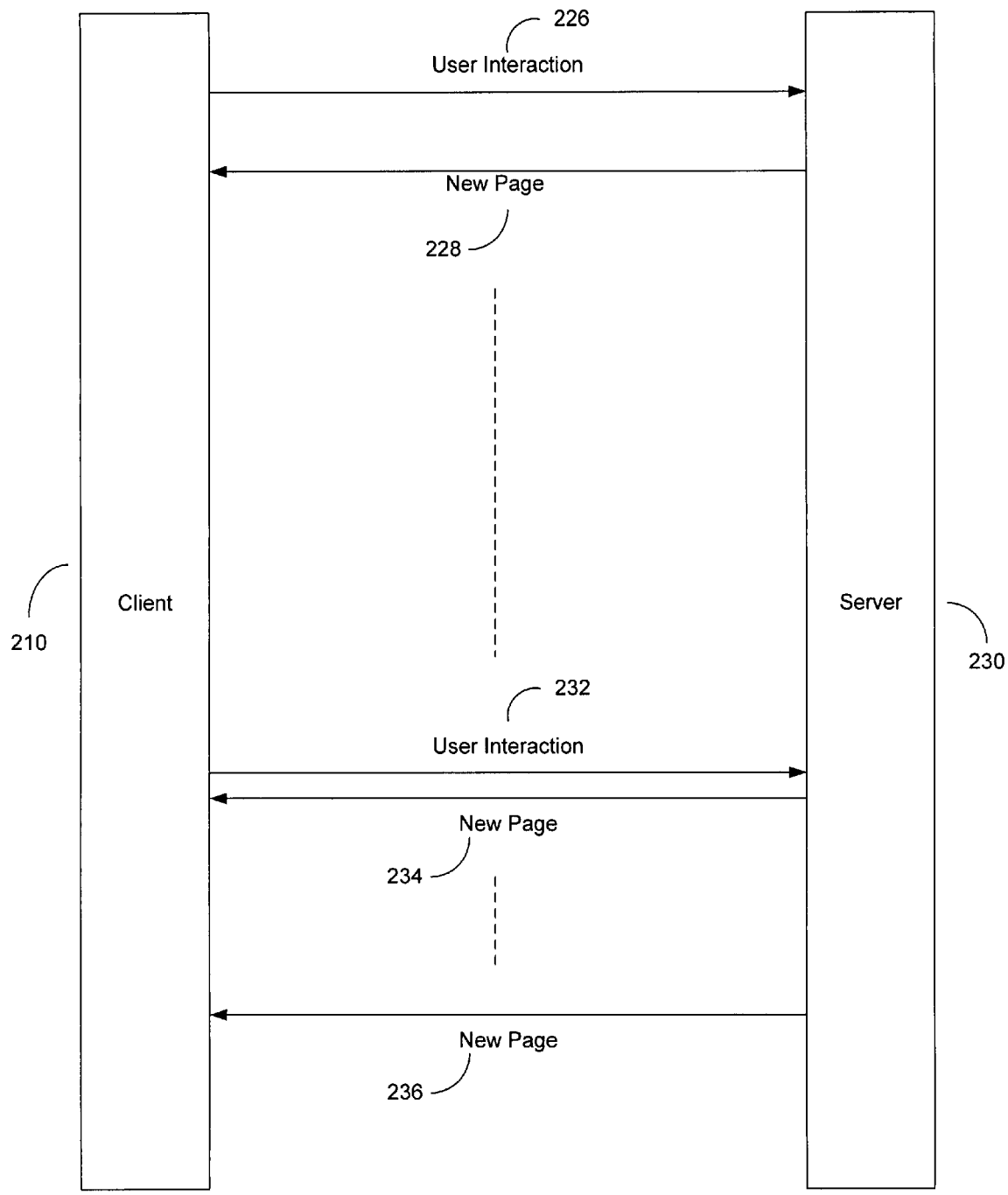

Referring now to FIGS. 2A and 2B, an exemplary communication sequence 200A and 200B between a wireless device 210 and a remote server 230 in accordance with one embodiment of the present invention is shown. At step 212 the client 210 sends a message to the server 230 identifying the wireless device type and its capabilities along with a request to access an application on the server. It is appreciated that the application is generic and independent of the wireless device type. The request from the client may also be a request to gain access to a specific resource (e.g., an image, sound, etc.). The response from the server may include the requested resource that may further include the version number which may be cached by the client.

In one embodiment, the wireless device type and its capabilities may include the brand, the model and the version number and may include some device capability information such as the screen size, the amount of memory, permanent storage capabilities, the color resolution, the image format, the list of java specification request (JSR) such as video, global positioning system (GPS) capabilities, access to address book, capability to initiate a call, short messaging system (SMS), multimedia messaging service (MMS) and the like. It is appreciated that the list of wireless device type provided herein is exemplary and should not be construed as limiting the scope of the present invention.

In one embodiment, the message from the client 210 may identify the version number of the "client." If the version number is too old or if the user requests a feature that is not available for the current version of the "client", the server may send an update "client" message to the user to notify the user of the user that a new version of the "client" is required. Moreover, the server may provide instructions on how to update the "client." The URL may be sent to the client 210 such that the browser could be launched by the user. Accordingly, the user can download the new version of the "client" without having to navigate through multiple web pages.

The message 212 may include:
request for a desired "application"
the version number of the client
the screen size
the amount of memory on the wireless device
the client's storage capabilities (size of the available permanent storage)
the number of colors supported by the client
the supported image format
the list of supported JSR. A JSR may be an optional API, not required by the J2ME specification, that the client may support. JSR may include video, GPS capabilities, access to the address book, capability to initiate a phone call/send a SMS/send a MMS from the application, etc.

In response to the message 212, the server 230 identifies the requested application and its corresponding custom configuration to be used by the client 210. At step 214, the server 230 sends a message to the client 210 identifying the corresponding custom configuration.

In one embodiment, the message identifying the custom configuration may indicate a version of the custom configuration selected for use with the requested application. The message communicated at step 214 may include:

the configuration data commonly known as skin version number for the requested application
the version number of the loading animation
the page identification and version number of the first page to display The client may cache data in its permanent memory. As a result, the client may request for the resources it needs by checking the status of its cache. For example, if a given resource for the requested application is not available in its cache or is stored with a different version number, then the client may request the identified resource from the server. Therefore, in response to receiving the message identifying the custom configuration, the client 210 determines whether the custom configuration has been previously stored in its cache. If the client 210 determines that the custom configuration is already present, the client 210 may further determine whether the stored information is the latest version. According to one embodiment, if the client 210 is unable to locate the identified custom configuration or its latest version, then it may send a request 216 to download the identified information (e.g., custom configuration) from the server 230.

It is appreciated that the request 216 is not necessarily limited to the custom configuration and may be extended to any information. For example, the request from the client 210 may include a request for an image, an audio sound, a loading animation that is displayed on the wireless device during download showing the download progress (e.g., download 57% complete) and the like. Other requests may include a request for a loading animation or a request to download a first page of the application.

It is appreciated that the server 230 in response to a request from the client 210 may send the requested content to the client 210. For example, the server 230 may send a custom configuration description, an application, a loading animation description that may be a static text, a static image, an animated image and the like. For static text, the content of the text may be provided, for a static image the identification of the image and its version number may be provided and for an animated image the identification of the image, the number of frames and the delay between frames may be provided. It is appreciated that the server in response to the request from the client sends the version number of the requested resource, which may be cached by the client.

It is appreciated that any image regardless of the context (e.g., configuration data, loading animation, etc.) may be identified by its identification number and its corresponding version number. In one embodiment, the client may store as many images as it can in a LRU (least recently used) cache to avoid wasting bandwidth in asking for images. Each time an image is sent from the server, the version number may be changed to clear the image in client's cache and ask the server for a new one.

It is further appreciated that similar caching mechanism may be used for other resources such as configuration data, the pages and the sound files. In one embodiment, the client may implement the optimal caching strategy (e.g., for low-end handsets, the cache will be very limited and the client will try to cache in order of priority such as the configuration data, the loading animation, images, etc.). It is also appreciated that a server may send a message to the client requesting the client to change or adopt a new caching strategy.

In this example, at step 218, the server 230 in response to the request from the client 210 sends the custom configuration to the client 210. The client 210 in one embodiment, caches the downloaded custom configuration such that it can be retrieved at a later time. The custom configuration may include a list of default values including default font, default color, default border color, default border thickness, default background color, default image, default menu style, default image for selected/non-selected icons and the like. The custom configuration may also include a list of optional values such as default font for edit zone, default font for ticker, default background color for static text (e.g., article) and the like where each optional value may be identified by an identification number. It is appreciated that the list provided herein regarding the custom configuration is exemplary and is not intended to limit the scope of the present invention.

At step 219, the device requests the first page of the application. At step 220, the server 230 sends the requested application content (e.g., the first page of the requested application). According to one embodiment, the requested application content is received as compiled content that includes a series of basic commands representing a page description. Basic commands are precompiled by the server 230 and ready for rendering by the client 210. It is appreciated that basic commands are written in a syntax that is device generic regardless of the device type but whose parameters are tailored based on the wireless device capabilities. As such, precompiled basic commands are discrete low level rendering commands tailored based on the rendering capability of the client 210.

In one example, a page description contains basic commands that may include a description of the scrolling area (e.g., starting and ending vertical positions), the horizontal and vertical coordinates, the width, the height, the type of component to be displayed (e.g., text, image, video, audio and the like), the unique identification of the rendering block to be used to render the component, related parameters for the rendering block and for display components (e.g., version number of the image) and the like. As a result, the client 210 may draw the screen according to the description as specified by the received discrete low level basic commands and in accordance with the identified custom configuration.

The client 210 according to one embodiment caches the downloaded compiled content such that it can be retrieved at a later time. For example, when a client is surfing the Internet, it may cache the displayed page such that the client can browse back without having to download the page again.

According to one embodiment, when content is received by the client 210 from the server 230, the older version of the content may be cleared from the cached memory in order to save space. For example, when a new version of a custom configuration is downloaded the older version may be cleared to free up memory space and the new one may be cached instead. In some embodiments, the client 210 may prioritize caching to achieve an optimal caching strategy, particularly for memory constraint wireless devices. According to one embodiment, the caching strategy of the client 210 may be modified by the server 230. It is appreciated that when enough memory space is available, the client 210 may store as much content as possible (e.g., custom configuration, animation download and the like) to avoid wasting bandwidth by repeatedly having to download them at a later time.

It is appreciated that steps 218 and 220 are shown as separate downloads, however, separate downloads for application content and the determined custom configuration are exemplary and should not be construed as limiting the scope of the present invention. Accordingly, the custom configuration and application content may be downloaded simultaneously. Moreover, it is appreciated that additional information (e.g., loading animation) may be downloaded separately or simultaneously with custom configuration and/or application. It is appreciated that the client 210 at step 222 may optionally send an acknowledgement message to the server 230 indicating successful receipt of the requested information.

At step 224, update (e.g., a new page) for the application may be pushed by the server 230 to the client 210 without user interaction. Pushed contents may be referred to as asynchronous messages that are sent by the server without user interaction that are triggered by a specific on the server side. For example, if the requested application has a ticker for displaying scrolling text (e.g., stock update) then as soon as an update is available the new text may be pushed to the client 210 to update the ticker. These asynchronous messages are not possible for wap application in a browser because using wap browser the only possible solution is to cyclically poll the server to determine whether new material is ready. As a result, wap wastes bandwidth and is not suitable for real-time notification such as SMS messaging.

In one example, at step 226 of FIG. 2B, the client 210 may initiate an action/command. An action may include a command that controls an edit box, controlling buttons, selection/de-selection of a check box or controlling a menu that when activated triggers an action, etc. An action may be described by page identification and some parameters to reflect the action of the user (e.g., the identification of the triggering control, the content of the edit zones, the selected item, etc.). For example, the client 210 may be in the process of filling out a form and the initiated command may be selecting the "submit" button to submit the completed form. As a result of the user interaction, at step 228 the server may send a new page to the client 210. For example, the new page may be a confirmation number and an indication that the submitted form was properly received.

It is appreciated that user interaction 232 may result in new page to be displayed at step 234. It is also appreciated that at step 236, a new page (e.g., asynchronous message) may be sent from the server 230 without an action by the client 210. For example, the client 210 may be reading news on the Internet using the wireless device. When breaking news occurs, the update may be pushed to the client 210, updating the page. In another example, the client 210 may be involved in SMS messaging and once a new message is ready, the message may be pushed as a new page by the server 230. For example, pushing a message from the server 230 to the client 210 may include an error message that something has happened on the server (e.g., server will be in maintenance and the user should disconnect and check back in a few minutes).

In one embodiment, the server 230 may push a message to the client 210 to clear pages history. During the user navigation, the client may keep the path history of the user such that the user can press the "back" key to go to the previous screen without requesting for the page to be downloaded again. Storing the path history is convenient because it allows a smooth user experience but it may require a large amount of memory on a wireless device. Accordingly, the server message may be used to notify that some pages in history can be safely cleaned up. In one example, this mechanism may be activated during a quality assurance when "out of memory" issues are detected and a message to clear pages history to ensure that memory is always available.

Similarly, a message from the server 230 to the client 210 to clear cache may be used to cleanup some resources in the cache in order to free up space in the memory. Moreover, a message may be sent from the server 230 to the client 210 to obtain client's status information that may be used for debugging purpose and the like. Obtaining client's status may be used to collect dynamic information about the wireless device at any given time to detect potential problems. As a result of receiving the status information, the client 210 may send a message providing status information for its cache, the history of pages, the amount of available memory, etc.

Figure 3:
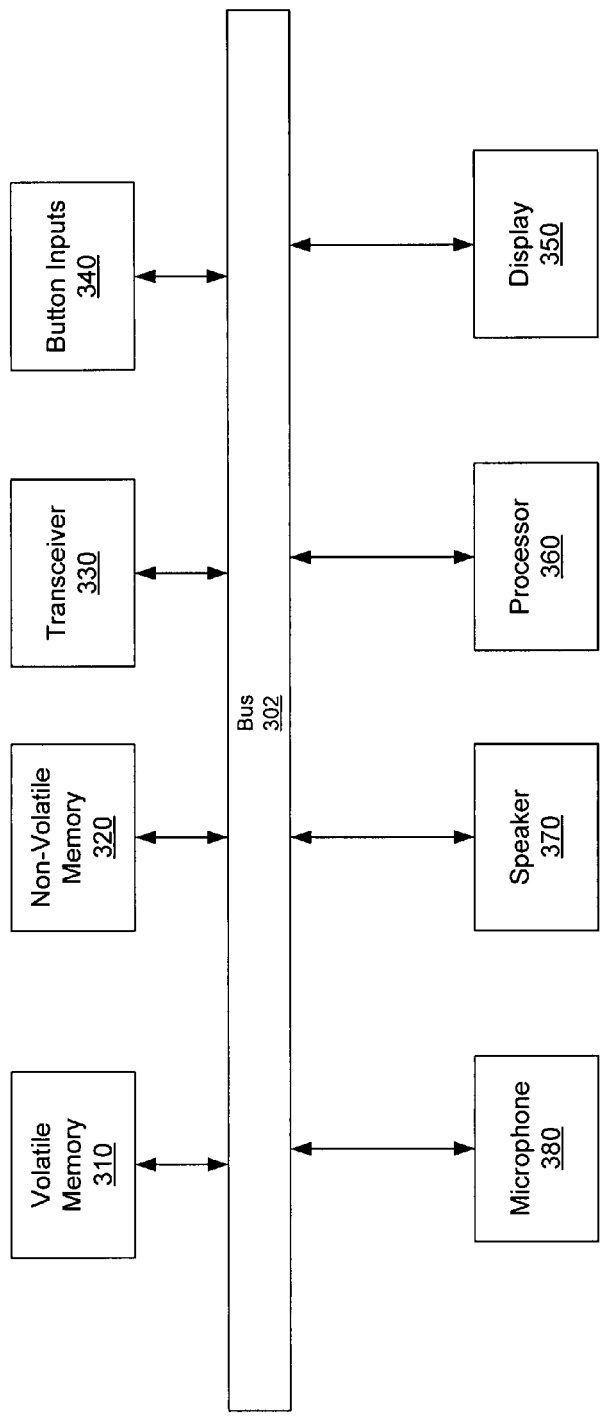
FIG. 3 shows an exemplary wireless device block diagram in accordance with one embodiment of the present invention.

Referring now to FIG. 3, an exemplary wireless device block diagram 300 in accordance with one embodiment of the present invention is shown. The wireless device 300 may implement the process for facilitating communication between the wireless device and the server as shown in FIGS. 1A-2B and includes a bus 302 or other communication mechanism for communicating information, and a processor 360 coupled with bus 302 for processing information.

Wireless device 300 also includes a volatile memory 310, such as a random access memory (RAM) or other dynamic storage device, coupled to bus 302 for storing information and instructions to be executed by processor 360. Volatile memory 310 also may be used for storing temporary variables or other intermediate information during execution of instructions to be executed by processor 360.

Wireless device 300 further includes a non-volatile memory 320 such as read only memory (ROM) or other static storage device coupled to bus 302 for storing static information and instructions for processor 360. A non-volatile storage device 320, such as a magnetic disk or flash memory, is provided and coupled to bus 302 for storing information and instructions and may store the persistent internal queue. According to one embodiment, the instructions for implementing the virtual device may be stored on any one of the memory components (e.g., RAM, ROM, non-volatile storage device and etc.). Wireless device 300 may be coupled via bus 302 to a display 350, such as liquid crystal display (LCD), for displaying information on the wireless device.

The term "computer-readable medium" as used herein refers to any medium that participates in providing instructions to processor 360 for execution. Such a medium may take many forms, including but not limited to, non-volatile media, volatile media, and transmission media. Non-volatile media includes, for example, optical or magnetic disks or the like. Volatile media includes dynamic memory and the like.

The wireless device 300 further includes a transceiver 330 for facilitating wireless communication with a remote server. The transceiver 330 may receive a series of basic commands from a remote server that may be used to render application and/or content on the display 350.

In one embodiment, the wireless device 300 further includes button inputs 340 e.g., a keyboard, for facilitating user interaction. For example, button inputs 340 may be used to navigate a website, enter email addresses, enter telephone numbers and the like. It is appreciated that button inputs 340 may be soft key buttons, a plurality of mechanical buttons, a rotating input component, a sliding input component, a voice activation component and the like.

The wireless device 300 may further include a microphone 380 for facilitating voice and audio input. The wireless device 300 may also include a speaker 370 for outputting audio. For example, the speaker 370 may be used to output a sound file such as mp3 or output voice outputs.

Figure 4:
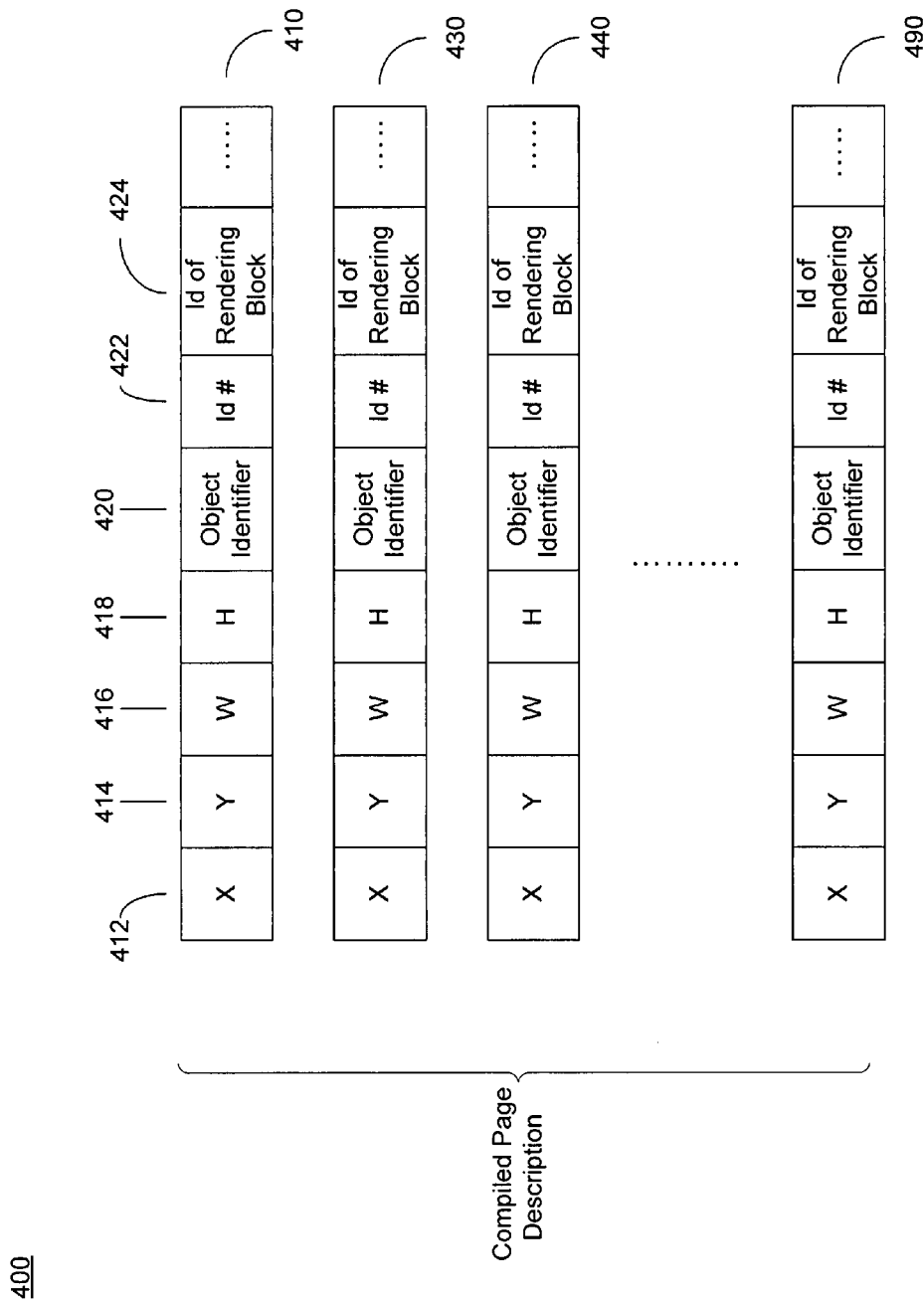
FIG. 4 shows an exemplary received compiled page description in accordance with one embodiment of the present invention.

Referring now to FIG. 4, an exemplary received compiled page description 400 in accordance with one embodiment of the present invention is shown. The compiled page description includes a series of basic commands. Each basic command may describe a given component on the page of the requested application to be rendered and includes a rendering block to be used. For example, a basic command 410 may be a description for rendering an image whereas a basic command 430 may be the description for rendering a video clip. Accordingly, a collection of basic commands 410, 430, 440, and 490 forms a single unified page to be rendered by the wireless device.

Basic commands are received from a remote server. The plurality of basic commands may be used by the wireless device to render application content (e.g., pages of the requested application) on the wireless device. For example, basic command 410 may include descriptions for rendering an image by specifying the Cartesian coordinates 412 and 414 of a screen region. Moreover, basic command 410 may further include the width 416 and the height 418 of the screen region to include image.

It is appreciated that the Cartesian coordinates 412 and 414 fields and the width 416 and height 418 fields may be the absolute coordinates and size of the renderable component on a given page of a requested application. However, it is appreciated that these fields may also include relative size and location of a given component for a given page of the application to be rendered.

In one embodiment, the object or renderable component may be identified by an object identifier 420 field. For example, the renderable object may be identified as an image. The image in one example may include an identification number 422 to identify the unique image that reflects the most recent image. The command also identifies the render block that is used to render the object.

It is appreciated that the basic command 410 may further include an identification of a rendering block 424. As a result, the rendering block 424 for providing user interaction may be identified. It is appreciated that basic commands may further include other field components for additional information e.g., immediate data, such as text. Thus it is appreciated that the fields described herein are exemplary and are not intended to limit the scope of the present invention.

Figure 5:
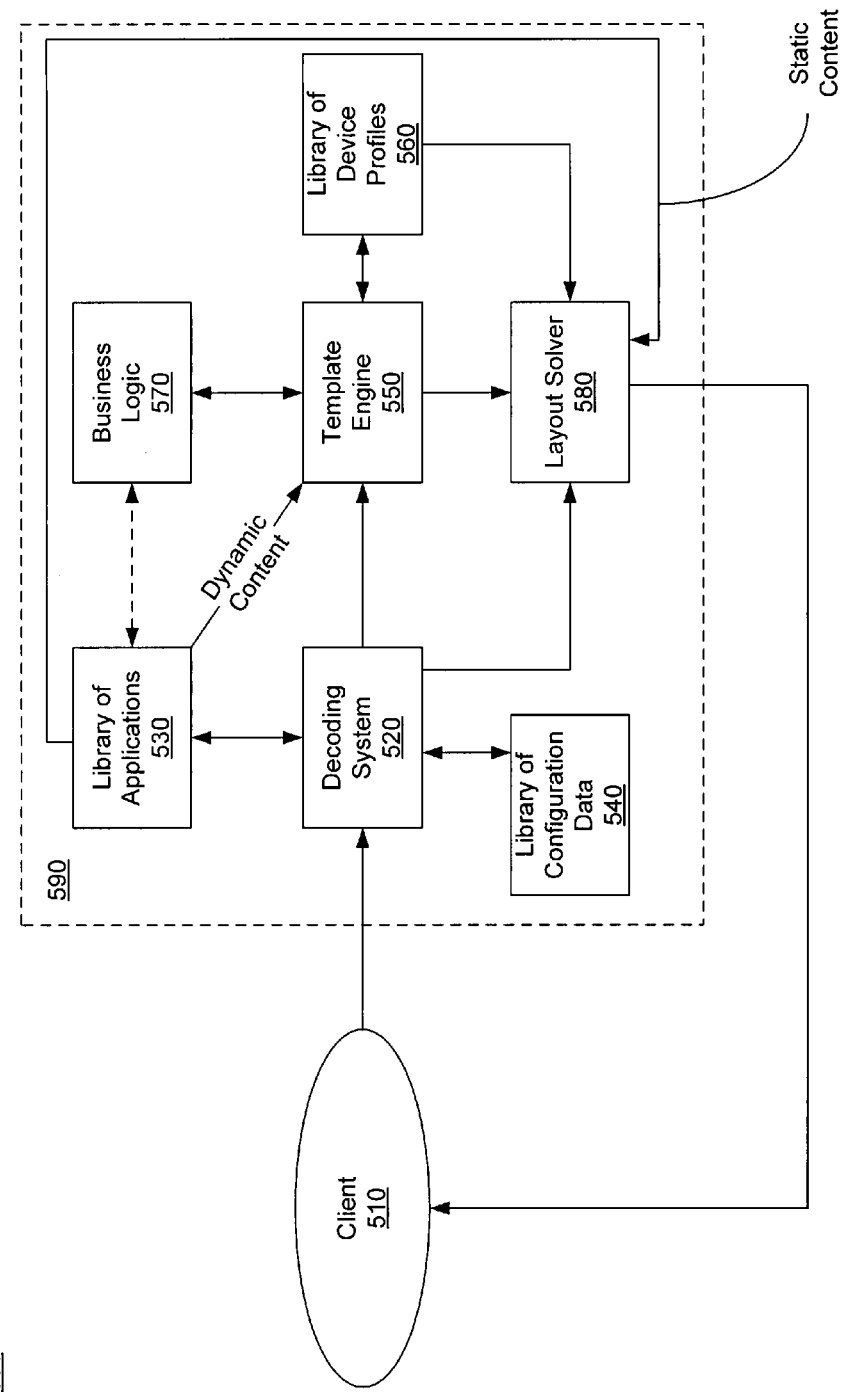
FIG. 5 shows an exemplary remote server block diagram in accordance with one embodiment of the present invention.

Referring now to FIG. 5, an exemplary remote server block diagram 500 in accordance with one embodiment of the present invention is shown. A client 510 is in communication with a remote server 590. As discussed above, the client 510 may initially send a message to the remote server 590 to request an application as well as identify the client's 510 type and its capabilities. A decoding system 520 of the server 590 receives the message from the client 510.

The decoding system 520 in response to the received message may access a library of applications 530 in order to locate and execute the requested application (e.g., Texas Holdem Poker, Internet and the like). It is appreciated that applications stored in the library of applications 530 are generic regardless of the device type. The requested application is then executed on the server 590. An application is defined by an application description file and a set of static resources, e.g., images, sounds, URLs, etc. The application description file describes all the screens of the application and the custom configuration of the application.

The decoding system 520 may also access a library of custom configuration data 540, where each application may have a corresponding custom configuration data to customize the appearance of the application. In response to the received message and after identifying the proper custom configuration, the decoding system 520 sends a message to the client 510 identifying the custom configuration data. In one embodiment, if the client 510 does not have the identified custom configuration, it may request it and the decoding system 520 may send the identified custom configuration to the client 510.

During application execution, pages are generated for display on the wireless device. During a page generation, the server determines whether the requested application generates static or dynamic data. For static applications such as viewing pictures or for pure text, the decoding system 520 may send a static page to a layout solver 580 described below.

On the other hand for dynamic pages such as real-time data, the server 590 inserts the dynamic data into a generic template and alters the resultant template based on the client profile.

More specifically, for dynamic data, the decoding system 520 communicates a page of the application to a template engine 550. The page is generic template describing the screen in a high level language, e.g., XML. The template engine 550 generates a dynamic page template by merging dynamic data with the generic template. The template engine 550 may be coupled to business logic 570 that computes dynamic data according to application execution. The business logic 570 may use model-view-controller architecture such that the user interface does not affect data handling and such that the data can be re-organized without changing the user interface. The request through the user interface of the wireless device results in an action in the business logic unit 570.

The business logic 570 may supply dynamic data to the template engine 550 for incorporation into a generic template. The template engine 550 according to one embodiment merges dynamic data provided by business logic 570 and generates screens of the requested application executed by the server to form a generic template. Thus, the template engine 550 provides a high level template (e.g., extensible markup language (XML) format) that includes the merged screens of application and dynamic data provided by the business logic 570.

According to one embodiment, the template engine 550 is also coupled to a library of device profiles 560. The library of device profiles 560 may include information on device capabilities. For example, the library of device profiles 560 may include information on the screen size, screen resolution, color resolution and the like. The server determines the client's 510 capabilities by accessing the library of device profiles 560 and based on the received message from the client 510 identifying itself (e.g., brand, model, memory size and the like).

As a result, the template engine 550 may eliminate content from its dynamic template output that is not supported by the client 510. For example, if the application includes an audio component but the client 510 does not have audio capability, then the template engine 550 may eliminate audio component from the generic template output. In another example, when the client 510 is short in memory, the template engine 550 may eliminate big images. Thus, a dynamic and high level template that includes data supported by the client 510 is generated. The dynamic template output from the template engine 550 may be in a high level language, e.g., XML.

The generic template supplied from 530 and the dynamic template supplied from 550 do not contain any specific or actual screen dimensions but rather only contain relative screen locations. At this stage, the templates are not very device specific regarding screen sizes, dimensions, etc.

The template engine 550 sends the high level and dynamic template to the layout solver 580. The layout solver 580 may also receive static page descriptions from the decoding system 520. In response to receiving the high level and dynamic template and/or static pages, the layout solver 580 translates the received information into a series of basic commands based on the client's capabilities.

The layout solver 580 may access the library of device profiles 560 to determine client's capabilities. The layout solver 580 may use the client's capabilities to tailor the received information (e.g., static application and/or dynamic application) based on the requesting client's 510 capability.

It is appreciated that basic commands may be low level compilation operable to render application content on the client 510 using the rendering blocks of the wireless device. For example, basic commands may layout page content for the requested application. Accordingly, the layout solver 580 receives a dynamic template from the template engine 550 and/or receives a static page from the decoding system 520 and translates it to device specific commands based on the client's capability.

It is appreciated that the specific commands based on the client's capability are written in a syntax that is device generic regardless of the wireless device type. However, the parameters of the basic commands are tailored based on the wireless device capabilities. The basic commands are then transmitted to the client 510 for rendering. In one embodiment, the basic commands are the compiled page description 400 as described in FIG. 4.

In one embodiment, the client 510 may initiate a further action by making a selection (e.g., selecting a selectable icon, sending SMS message and the like). The server 590 may receive the initiation of a command from the client 510 and cause an application (e.g., a new application or the requested application) to execute accordingly or provide an update. In one embodiment, the server 590 may automatically provide an update and push content to the client 510 without user involvement (e.g., when SMS message is ready for the client 510, when a stock update is ready in a ticker and the like).

Different blocks have been described as separate units. However, it is appreciated that each functional unit described herein may be integrated as a single working unit. As such, depiction of functional units as separate units is exemplary and should not be construed as limiting the scope of the present invention.

Figure 6:
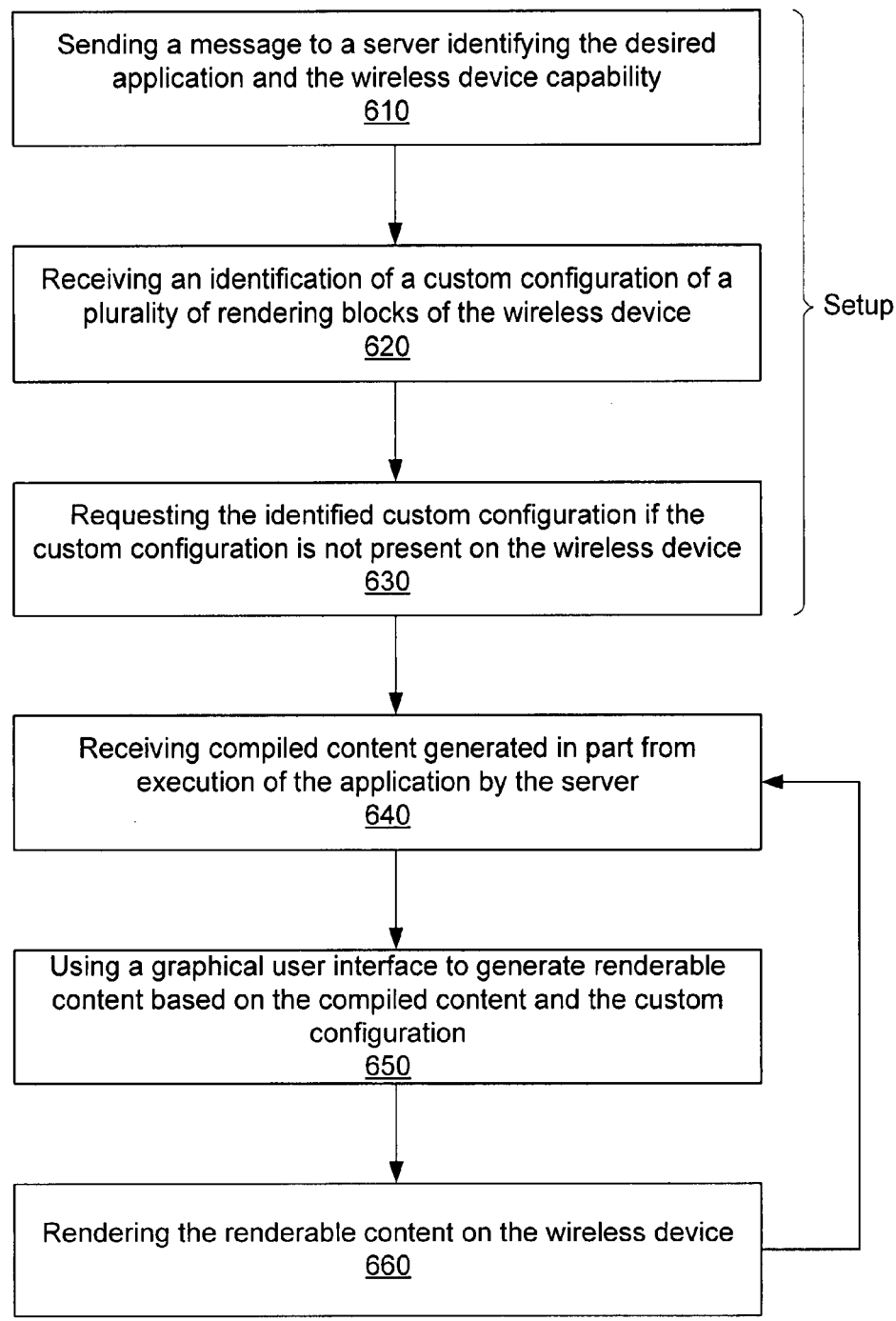
FIG. 6 shows an exemplary computer controlled flow diagram for rendering content on a wireless device in accordance with one embodiment of the present invention.

Referring now to FIG. 6, an exemplary computer controlled flow diagram 600 for rendering content on a wireless device in accordance with one embodiment of the present invention is shown. At step 610, the wireless device may send a message to a remote server requesting an application as well as identifying itself and its capability (e.g., screen size, screen resolution and the like). At step 620, the wireless device receives a message from the server identifying a custom configuration to be used to pre-configure a plurality of rendering blocks of the wireless device. The custom configuration customizes the look and feel of the content displayed on the wireless device from execution of the requested application.

According to one embodiment, the wireless device may store multiple custom configurations. As a result, when the custom configuration to be used is identified by the server, the wireless device may determine whether the custom configuration is present on the wireless device. If the custom configuration is not present, the wireless device at step 630 requests a download of the custom configuration from the server. According to one embodiment, the downloaded custom configuration may be cached by the wireless device for later use to conserve bandwidth. It is appreciated that steps 610-630 are for setup purposes and may not be necessary upon subsequent action by the user or the server when an application is being executed.

At step 640, the wireless device receives compiled content generated in part from execution of the requested application by the server. It is appreciated that the compiled content may include basic commands that are expressed in a syntax that is generic to the wireless device but where the parameters of the basic commands are based on the wireless device capability.

At step 650, the wireless device uses a graphical user interface to generate renderable content based on the received compiled content and the custom configuration. In one embodiment, content is rendered by processing the compiled content using the reader and by issuing commands from the reader to rendering blocks of the graphical user interface based on the rendering commands of the compiled content. Accordingly, at step 660, the content is rendered by the wireless device.

It is appreciated that in response to rendering content, a user of the wireless device may initiate an action (e.g., by selecting an icon) that may further cause a message to be sent to the server. The server in response to a user interaction may compile additional content and send the additional compiled content to the wireless device. It is appreciated that since the setup for the requested application has been completed, steps 610-630 may be eliminated during user interaction with the rendered application. It is further appreciated that the server may automatically and without initiation of an action by the user push additional e.g., updated compiled content to the wireless device. For example, in an SMS application, a message may be ready for the wireless device. The server may send the message to the wireless device without initiation by the user.

Figure 7:
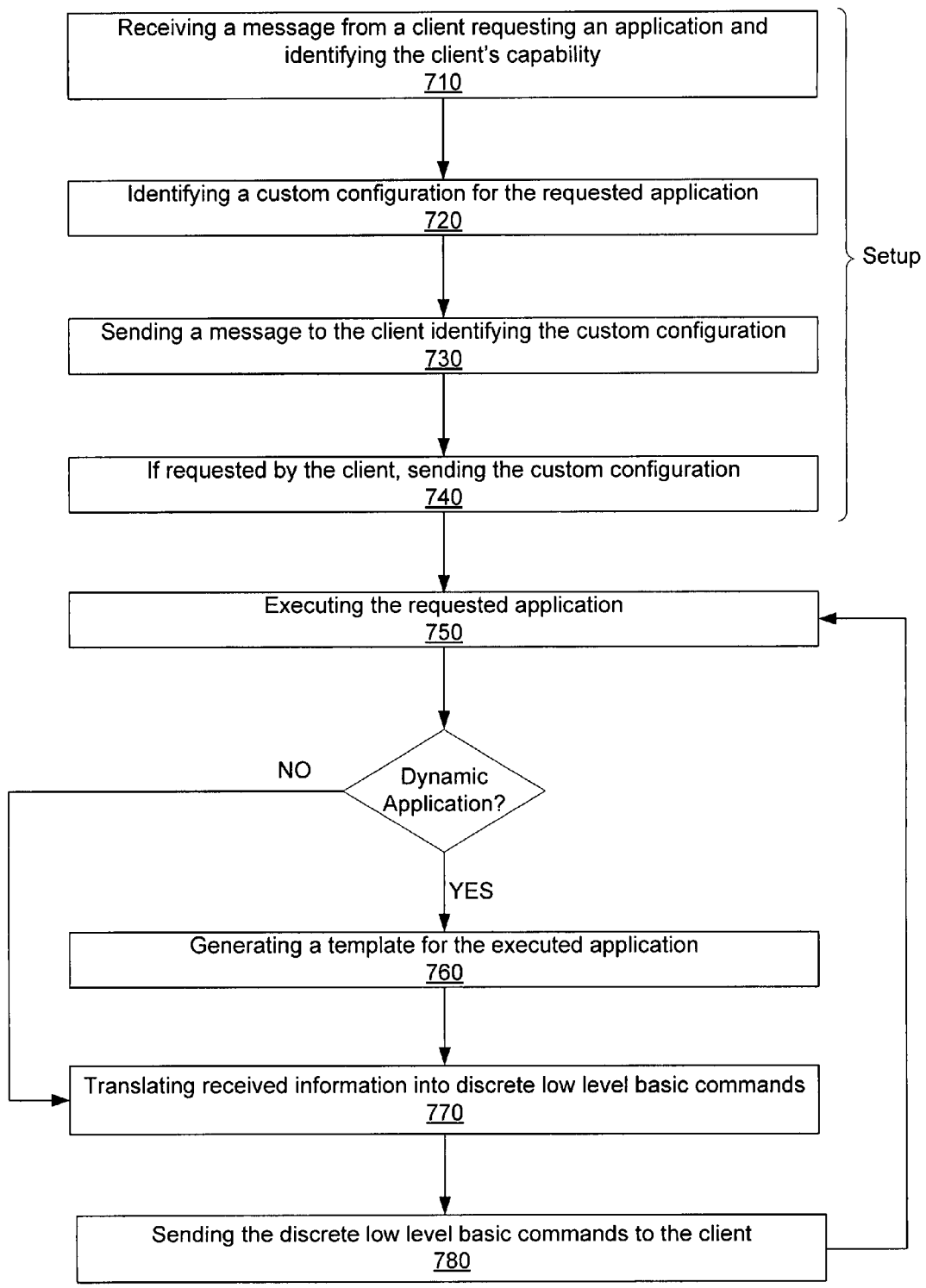
FIG. 7 shows an exemplary computer controlled flow diagram of a server implemented method for processing data for a wireless device in accordance with one embodiment of the present invention.

Referring now to FIG. 7, an exemplary computer controlled flow diagram 700 of a server implemented method for processing data for a wireless device in accordance with one embodiment of the present invention is shown. At step 710, the server may receive a message from a client requesting execution of an application and identifying the client and the client's capability. In response to receiving the message, at step 720 the server may locate the requested application as well as the corresponding custom configuration for the requested application by accessing a library of applications and a library of configuration data respectively. It is appreciated that applications in the library of applications are device generic.

At step 730, the server may send a message to the client identifying the corresponding custom configuration to use for the requested application. If the client requests a download of the custom configuration, at step 740 the server may send the custom configuration to the client. At this stage, the setup for executing an application is complete.

At step 750, the server may execute the requested application. The server may then determine whether the executed application produces dynamic or static content. If the content produced is dynamic, at step 760 the server uses a template engine to generate a generic template that contains dynamic data. In one embodiment, the template generated may be in compliance with extensible markup language (XML) and the like.

According to one embodiment, the template engine eliminates content produced that are not supported by the wireless device. For example, the template engine may use a library of device profiles and the identified device capability from the wireless device to determine the capability of the wireless device. As a result, content that is not supported by the wireless device may be eliminated.

At step 770, the layout solver receives either static data or dynamic data. In either case, the layout solver uses the device profile to tailor and translate or compile the received data into commands of a generic syntax whose parameters are tailored based on the capability of the wireless device. For example, the layout solver may determine the content layout on a given page of the requested application by providing the coordinates, size, object identifier, object identification and the like. The generated basic commands are discrete low level commands operable to render content on the wireless device. Thus, basic commands are generated in a syntax that is generic to the wireless device but are application specific based on the wireless device capability.

At step 780, the discrete low level basic commands may be transmitted to the client for rendering. It is appreciated that in response to a user interaction received, the server may produce and compile additional content. According to one example, the server may produce additional content without involvement by the wireless device user (e.g., when a message in SMS messaging is ready for the wireless device). It is appreciated that since the setup for the requested application and its corresponding custom configuration is complete, execution of additional content may be performed without execution of steps 710-740.

Accordingly, applications can be developed in a generic manner regardless of the device type. Developing generic applications regardless of the wireless device type is in part possible because the server may be used to operate on a generic application and tailor the result of executing a generic application based on a wireless device capability. As a result, software vendors are relieved from tailoring their application to each wireless device. In other words, software vendors can develop a generic application because the output of the generic application can be tailored based on each wireless device type by the server. Moreover, since applications and basic commands for rendering applications are performed on the server, providing patches and updates can be facilitated by updating the server, thereby eliminating the need to access each wireless device individually.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of rendering content on a wireless device, said method comprising:
   receiving an identification of a custom configuration of a plurality of rendering blocks of said wireless device, wherein said custom configuration is associated with an application and configures said plurality of rendering blocks to render content in a manner customized to said application;
   receiving compiled content generated in part from execution of said application wherein said compiled content comprises render commands expressed in a syntax that is generic to said wireless device;
   using a graphical user interface comprising said plurality of rendering blocks to generate renderable content based on said compiled content and said custom configuration; and
   rendering said renderable content on said wireless device, wherein said receiving compiled content comprises:
   receiving first compiled content specific to a first page of said application; and
   receiving second compiled content specific to a second page of said application, wherein said custom configuration is applicable to both said first and second compiled content.

2. A method as described in claim 1 wherein said using a graphical user interface comprising said plurality of rendering blocks to generate renderable content comprises:

processing said compiled content using a reader of said wireless device; and issuing commands from said reader to individual rendering blocks of said graphical user interface based on said rendering commands of said compiled content.

3. A method as described in claim 1 wherein said renderable content comprises audio content and display content.

4. A method as described in claim 1 wherein said compiled content is partially resultant from said application operating on a remote server.

5. A method as described in claim 1 wherein said compiled content is specific to the rendering capabilities of said wireless device.

6. A method as described in claim 1 wherein each of said plurality of rendering blocks operates specific to a wireless device type of said wireless device and each is instructed using a syntax that is generic to said wireless device type.

7. A method as described in claim 6 wherein said custom configuration comprises a syntax that is generic regarding said wireless device type.

8. A method as described in claim 1 wherein said custom configuration comprises configuration information and content specific to said application.

9. A method as described in claim 1 wherein said custom configuration is one of a plurality of memory-stored custom configurations stored by said wireless device and wherein further said identifying said custom configuration comprises receiving an identifier that identifies said custom configuration.

10. A method as described in claim 1 further comprising receiving and storing said custom configuration.

11. A method as described in claim 1 wherein said plurality of rendering blocks of said graphical user interface comprises:

a first block that controls the rendering of ticker information across a display screen of said wireless device;

a second block that controls the rendering of button images on said display screen; and a third block that controls the rendering of audio on a speaker of said wireless device.

12. A non-transitory computer usable medium comprising instructions therein that when executed by a processor implement a method of rendering content on a wireless device, said method comprising:

receiving an identification of a custom configuration of a plurality of rendering blocks of said wireless device, wherein said custom configuration is associated with an application and configures said plurality of rendering blocks to render content in a manner customized to said application;

receiving compiled content generated in part from execution of said application wherein said compiled content comprises render commands expressed in a syntax that is generic to said wireless device;

using a graphical user interface comprising said plurality of rendering blocks to generate renderable content based on said compiled content and said custom configuration; and rendering said renderable content on said wireless device, wherein said receiving compiled content comprises:

receiving first compiled content specific to a first page of said application; and receiving second compiled content specific to a second page of said application, wherein said custom configuration is applicable to both said first and second compiled content.

13. A non-transitory computer usable medium as described in claim 12 wherein said using a graphical user interface comprising said plurality of rendering blocks to generate renderable content comprises:

processing said compiled content using a reader of said wireless device; and issuing commands from said reader to individual rendering blocks of said graphical user interface based on said rendering commands of said compiled content.

14. A non-transitory computer usable medium as described in claim 12 wherein said renderable content comprises audio content and display content.

15. A non-transitory computer usable medium as described in claim 12 wherein said compiled content is partially resultant from said application operating on a remote server.

16. A non-transitory computer usable medium as described in claim 12 wherein said compiled content is specific to the rendering capabilities of said wireless device.

17. A non-transitory computer usable medium as described in claim 12 wherein each of said plurality of rendering blocks operates specific to a wireless device type of said wireless device and each is instructed using a syntax that is generic to said wireless device type.

18. A non-transitory computer usable medium as described in claim 17 wherein said custom configuration comprises a syntax that is generic regarding said wireless device type.

19. A non-transitory computer usable medium as described in claim 12 wherein said custom configuration comprises configuration information and content specific to said application.

20. A non-transitory computer usable medium as described in claim 12 wherein said custom configuration is one of a plurality of memory-stored custom configurations stored by said wireless device and wherein further said identifying said custom configuration comprises receiving an identifier that identifies said custom configuration.

21. A non-transitory computer usable medium as described in claim 12 wherein said method further comprises receiving and storing said custom configuration.

22. A non-transitory computer usable medium as described in claim 12 wherein said plurality of rendering blocks of said graphical user interface comprises:

a first block that controls the rendering of ticker information across a display screen of said wireless device;

a second block that controls the rendering of button images on said display screen; and a third block that controls the rendering of audio on a speaker of said wireless device.

23. A wireless device operable to communicate with a remote server, said wireless device comprising:

a transceiver coupled to a bus and operable to receive a custom configuration that is associated with an application, said transceiver also operable to receive compiled content generated in part from execution of said application and comprising a plurality of rendering commands expressed in a syntax that is generic to said wireless device;

a memory coupled to said bus and operable to store said compiled content and said custom configuration;

a processor coupled to said bus and operable to implement the following:

a graphical user interface comprising a plurality of rendering blocks and operable to generate renderable content based on said compiled content and said custom configuration wherein said custom configuration is operable to configure said plurality of rendering blocks to render content in a manner customized to said application; and an engine for reading said compiled content and responsive thereto for causing said graphical user interface to generate said renderable content based on said render commands; and a display device coupled to said bus and operable to render a portion of said renderable content, wherein said compiled content comprises:

a first compiled content specific to a first page of said application; and a second compiled content specific to a second page of said application, wherein said custom configuration is applicable to both said first and second compiled content.

24. The wireless device as described in claim 23 wherein said engine is further operable to issue commands to individual rendering blocks of said graphical user interface based on said plurality of rendering commands of said compiled content.

25. The wireless device as described in claim 23 further comprising an audio rendering device coupled to said bus and wherein said renderable content comprises audio content and display content.

26. The wireless device as described in claim 23 wherein said compiled content is partially resultant from said application operating on a remote server.

27. The wireless device as described in claim 23 wherein said compiled content is specific to the rendering capabilities of said wireless device.

28. The wireless device as described in claim 23 wherein each of said plurality of rendering blocks operates specific to a wireless device type of said wireless device and each is instructed using a syntax that is generic to said wireless device type.

29. The wireless device as described in claim 28 wherein said custom configuration is expressed in a syntax that is generic to said wireless device type.

30. The wireless device as described in claim 23 wherein said custom configuration comprises configuration information and content specific to said application.

31. The wireless device as described in claim 23 wherein said custom configuration is one of a plurality of memory-stored custom configurations stored in said memory.

32. The wireless device as described in claim 23 wherein said plurality of rendering blocks of said graphical user interface comprises:

a first block that controls the rendering of ticker information across said display screen of said wireless device;

a second block that controls the rendering of button images on said display screen; and a third block that controls the rendering of audio on a speaker of said wireless device.

33. The wireless device as described in claim 23 wherein said plurality of rendering blocks of said graphical user interface comprises:

a first block that controls the rendering of a scroll bar on said display screen of said wireless device;

a second block that controls the rendering of an input box on said display screen of said wireless device; and a third block that control the rendering of a text display region on said display screen of said wireless device.

* * * * *